(12) United States Patent
Taleb et al.

(10) Patent No.: US 8,665,962 B2
(45) Date of Patent: Mar. 4, 2014

(54) DIGITAL TELEVISION DECODER

(75) Inventors: Hassan Taleb, Aulnay-sous-Bois (FR); David Ludet, Etoilles (FR); Eric Delaunay, Maintenon (FR); Nicolas Beaunoir, Suresnes (FR); Thierry Furet, Rambouillet (FR); Franck Bellanger, Paris (FR); Laurent Chauvier, Paris (FR); Laurent Proust, Paris (FR); Laurent Douat, Clamart (FR)

(73) Assignee: NDS Technologies France, Issy-les-Moulineaux (FR)

( * ) Notice: Subject to any disclaimer, the term of this patent is extended or adjusted under 35 U.S.C. 154(b) by 1030 days.

(21) Appl. No.: 12/227,758

(22) PCT Filed: May 29, 2007
(Under 37 CFR 1.47)

(86) PCT No.: PCT/GB2007/001983
§ 371 (c)(1),
(2), (4) Date: Feb. 20, 2009

(87) PCT Pub. No.: WO2007/138306
PCT Pub. Date: Dec. 6, 2007

(65) Prior Publication Data
US 2009/0316796 A1    Dec. 24, 2009

(30) Foreign Application Priority Data
May 30, 2006    (FR) ..................................... 06 04815

(51) Int. Cl.
*H04N 7/12*    (2006.01)
*H04N 11/02*    (2006.01)
*H04N 11/04*    (2006.01)

(52) U.S. Cl.
USPC ............. 375/240.25; 375/E7.027; 455/343.1; 455/343.2; 455/343.3; 455/343.4; 455/343.5; 455/343.6; 714/24; 713/321; 348/333.13

(58) Field of Classification Search
USPC ........................................ 375/240.25, E7.027
See application file for complete search history.

(56) References Cited

U.S. PATENT DOCUMENTS 4,590,555 A * 5/1986 Bourrez ........................ 718/103
4,646,307 A   2/1987 Nishimura
(Continued)

FOREIGN PATENT DOCUMENTS

EP    1 286 262 A1    2/2003

OTHER PUBLICATIONS

Katsuya Hasegawa et al. "Low-Power Video Encoder/Decoder Chip Set for Digital VCR's." IEEE Journal of Solid-State Circuits, vol. 31, No. 11, Nov. 1996.*

(Continued)

*Primary Examiner* — Taghi Arani
*Assistant Examiner* — Narciso Victoria
(74) *Attorney, Agent, or Firm* — Husch Blackwell LLP (57) ABSTRACT

A method of operating a digital television decoder is disclosed. The decoder includes a memory, the memory storing onboard software, and the decoder is operable in a run mode to execute the onboard software. The method comprises: activating a power saving mode on the decoder; and upon activating the power saving mode: maintaining power to the memory; suspending execution of the onboard software; acquiring an execution context of the onboard software; updating the execution context of the onboard software to form an updated execution context; and saving the updated execution context in the memory.

16 Claims, 3 Drawing Sheets

(56) References Cited

U.S. PATENT DOCUMENTS

| | | | |
|---|---|---|---|
| 5,021,983 A | 6/1991 | Nguyen et al. | |
| 5,204,963 A | 4/1993 | Noya et al. | |
| 6,292,233 B1 | 9/2001 | Erba et al. | |
| 6,301,673 B1* | 10/2001 | Foster et al. | 713/323 |
| 6,968,469 B1 | 11/2005 | Fleischmann et al. | |
| 2003/0140238 A1* | 7/2003 | Turkboylari | 713/193 |
| 2005/0044433 A1 | 2/2005 | Dunstan | |

OTHER PUBLICATIONS

"SH-4 CPU Core Architecture, Preliminary Data", (ST Microelectronics and Hitachi; Sep. 12, 2002) [in particular, p. 39, section 2.8.4].

Apr. 25, 2012 Office Communication in connection with prosecution of EP 07 732 999.3.

* cited by examiner

Standby Command

DIGITAL TELEVISION DECODER

RELATED APPLICATION INFORMATION

The present application is a 35 USC §371 application of PCT/GB2007/001983, filed on 29 May 2007 and entitled "Digital Television Decoder", which was published on 6 Dec. 2007 in the English language with International Publication Number WO 2007/138306 A1, and which relies for priority on French Patent Application No. 06/04815 filed on 30 May 2006 and published as FR2901949 on 7 Dec. 2007.

FIELD OF THE INVENTION

The present invention relates to a digital television (TV) decoder and a standby procedure for a digital TV decoder, and particularly, but not exclusively to decoders that have a power saving standby function.

BACKGROUND OF THE INVENTION

Standby mode is a power saving mode for electronic devices that saves electrical power consumption when the electronic device is idle. Standby mode places the electronic device into a state of "waiting for a power-up command".

In a TV channel selection terminal, commonly referred to as a decoder or set top box (STB), putting the STB into standby mode results in deactivation of the decoder inputs and outputs.

Standby modes in some decoders (such as those deployed by CanalSat, Sogecable and Astro) also result in the stopping of the decoder's onboard software and the turning off/shutting down of most of the decoder's hardware components, including the decoder's random access memory (RAM) memory.

U.S. Pat. No. 5,021,983 describes a method and apparatus for suspending the operation of a computer at any desired point and resuming operation at exactly the same point. At the point where suspension is chosen, the current state of the computer is stored in the computer's Random Access Memory and power is disconnected to all other components in the computer. When resumption of operation is commanded, power is restored to all components and the current computer state is retrieved from the Random Access Memory and restored, allowing operations to continue from exactly the same point as they were suspended.

U.S. Pat. No. 4,646,307 describes an electronic apparatus, for example, a programmable calculator, a portable or handheld computer, a memory module, or a data collector, that incorporates a battery backup RAM, and means for first checking the memory contents when the power-OFF command has been activated, and then causes the results of the checking to be stored in a specific area of the RAM. When the memory contents checking command has been activated, the system rechecks the memory contents to see if the memory contents have varied and can securely confirm whether the memory contents of either the effective programs or data have been correctly backed up when either replacing the battery or during storage of an electronic apparatus that uses the battery backup RAM.

U.S. Pat. No. 6,968,469 describes a CPU that automatically preserves the CPU context in a computer memory that remains powered-up when the CPU is powered down in sleep mode. By means of the preserved CPU context, the CPU is able to instantly and transparently resume program execution at the instruction of the program that was asserted for execution when the CPU was powered down. The CPU is permitted to power down frequently, even during execution of a program, and results in reduced average overall power consumption.

The disclosures of all references mentioned above and throughout the present specification, as well as the disclosures of all references mentioned in those references, are hereby incorporated herein by reference.

SUMMARY OF THE INVENTION

Cache memory (i.e. RAM memory associated with the decoder's central processing unit (CPU)) is often used to store decoder applications (e.g. Digital Video Broadcast-Multimedia Home Platform (DVB-MHP) applications) and other digital data (e.g. the Event Information Table (EIT), which is used by electronic program guide (EPG) applications) that are broadcast with audio-visual (A/V) data and downloaded by the decoder. These downloads can take can take a substantial amount of time to download (e.g. 5-15 minutes, for example, just for the EIT data).

Sometimes, but by no means always, decoders have a mass storage system (such as a hard disk drive) where these downloaded applications and downloaded digital data can be backed-up. However, this type of hard disk drive architecture is costly and is not always suitable for mass market applications.

As mentioned previously, when some decoders enter into standby or power saving mode, the system is shut down and the memory is rebooted. If these decoders have neither a mass storage system (such as a hard drive) nor RAM that is permanently powered, all the downloaded applications and downloaded digital data would then be lost and it can take several minutes to restart the system owing to the time needed to reload the various cache memories.

There is provided in accordance with an embodiment of the present invention a method of operating a digital television decoder, the decoder including a memory, the memory storing onboard software, where the decoder is operable in a run mode to execute the onboard software, the method including: activating a power saving mode on the decoder; and upon activating the power saving mode: maintaining power to the memory; suspending execution of the onboard software; acquiring an execution context of the onboard software; updating the execution context of the onboard software to form an updated execution context; and saving the updated execution context in the memory.

Preferably, execution of the onboard software remains suspended until the run mode is activated, and upon activation of the run mode the method further includes: resuming execution of the onboard software using the updated execution context.

Preferably, the decoder receives a group of applications and data together forming an interactivity image, and updating the execution context includes updating the interactivity image.

Preferably, if the run mode is activated prior to the end of updating the interactivity image, execution of the onboard software resumes using an execution context that was previously saved in the memory.

Preferably, prior to suspending execution of the onboard software, the onboard software is rebooted.

Preferably, the onboard software is rebooted if the time that has elapsed since the onboard software was previously rebooted exceeds a predetermined value.

Preferably, the onboard software is rebooted if execution of the onboard software has been suspended a predetermined number of times.

Preferably, the memory comprises random access memory.

There is provided in accordance with a further embodiment of the present invention a digital television decoder including a memory, the memory storing onboard software, where the decoder is operable in a run mode to execute the onboard software, where the decoder is operable in a power saving mode to: maintain power to the memory, suspend execution of the onboard software, acquire an execution context of the onboard software, update the execution context of the onboard software to form an updated execution context, and save the updated execution context in the memory.

Preferably, the decoder is further operable to suspend execution of the onboard software until the run mode is activated; and upon activation of the run mode to resume execution of the onboard software using the updated execution context.

Preferably, the decoder is further operable to receive a group of applications and data together forming an interactivity image; and to update the execution context by updating the interactivity image.

Preferably, if the run mode is activated prior to the end of updating the interactivity image, the decoder is operable to resume execution of the onboard software using an execution context that was previously saved in the memory.

Preferably, the decoder is further operable to reboot the onboard software prior to suspending execution of the onboard software.

Preferably, the decoder is operable to reboot the onboard software if the time that has elapsed since the onboard software was previously rebooted exceeds a predetermined value.

Preferably, the decoder is further operable to measure the time that has elapsed using a clock; and to reset the time to compensate for the reduction of the clock frequency while the decoder is in the power saving mode.

Preferably, the decoder is operable to measure the time that has elapsed using an internal clock.

Alternatively, the decoder is operable to measure the time that has elapsed using an external clock.

Preferably, the decoder is operable to reboot the onboard software if execution of the onboard software has been suspended a predetermined number of times.

Preferably, the memory comprises random access memory.

Preferably, the memory comprises: a secure area, the secure area being addressed by a fixed address; and a data storage area for the onboard software, where the data storage area includes a plurality of context storage areas operable to store execution contexts, and where the secure area includes property storage areas operable to store properties of the context storage areas.

Preferably, each of the property storage areas of the secure area includes an address for a context storage area of the data storage area.

Preferably, each of the property storage areas of the secure area comprises a checksum that is computed for a context storage area of the data storage area.

Preferably, following a reboot of the onboard software, the decoder is operable to: recompute checksums for each context storage area of the data storage area; and compare the recomputed checksums with the checksums stored in the property storage areas of the secure area; where if the recomputed checksum that is recomputed for a context storage area is the same as the checksum stored in an associated property storage area of the secure area, the execution context saved in the context storage area is used to run the onboard software.

Preferably, each of the property storage areas stores information relating to type of data and size of memory that are allocated to an associated context storage area.

Preferably, the decoder further includes: an internal clock running at a clock rate; and other hardware, where the decoder is further operable in the power saving mode to: limit the clock rate and shut down hardware not critical for maintaining power to the memory.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
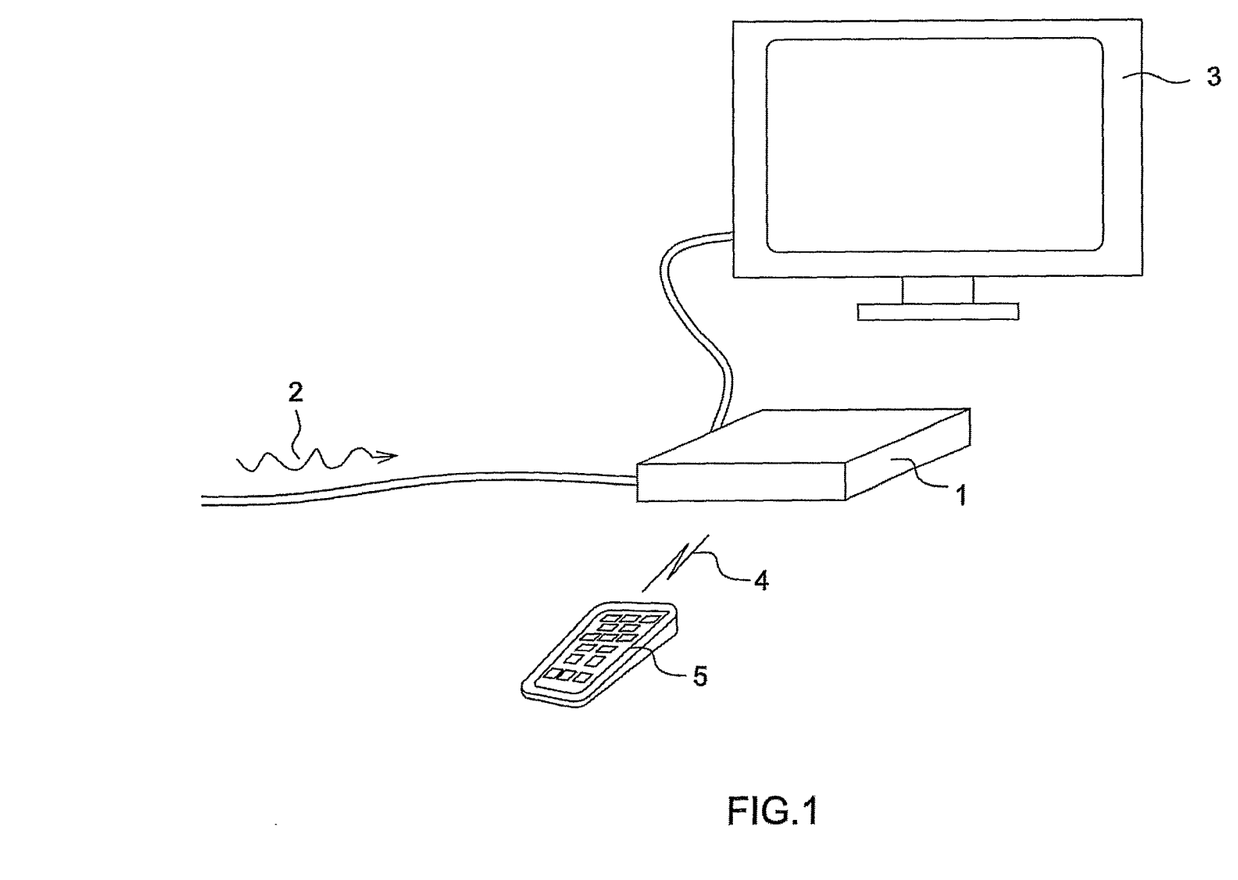
FIG. 1 is an illustration of an operating environment according to embodiments of the present invention.

Referring first to FIG. 1, a terminal 1 receives audio visual (A/V) signals 2 that carry the TV programs on a broadcast channel, as well as related digital data. The terminal decodes the A/V signals received and then supplies the selected TV programs to an associated TV 3. While the TV programs are playing out, the terminal 1 (hereinafter referred to as a decoder 1) runs onboard software stored within decoder 1, the onboard software comprising application programs (e.g. electronic program guide (EPG), pay-per-view (PPV) resident application, video-on-demand (VOD) resident application etc.), an intermediate software layer (middleware), software layers for controlling the device layer interface that provides an interface between the middleware and the decode hardware controllers, and all other layers that are needed to operate the decoder.

Decode 1 can receive control commands from a remote control device 5 (e.g. via infra-red communication). Remote control device 5 is used by a user/subscriber to select TV programs to view, control the volume of TV 3 etc. Remote control device 5 is also used by a user/subscriber to put decoder 1 into a standby mode. Decoder 1 can also be put into standby mode using a button on decoder 1.

In embodiments of the present invention, a power saving mode is advantageously used in order to reduce the power consumption of decoder 1 without actually shutting down the onboard software. Thus decoder 1 does not go into a conventional standby mode as would be previously understood by someone skilled in the art, but instead goes into a frozen mode in which all processes that are being run by the onboard software in decoder 1 are frozen without actually being stopped. In addition, while decoder 1 is in this frozen mode, the RAM in decoder 1 is kept powered/refreshed without the need for any specific powered RAM hardware architecture (e.g. independent or additional batteries) whilst the other hardware components in decoder 1 are stopped. A power saving mode is then achieved by limiting the decoder's internal clock rates and shutting down hardware not critical for the conservation of the RAM. In frozen mode, the RAM remains in the same physical state it was in just before all the processes that are being run by the onboard software are frozen. It is to be noted that reduction of the clock rates of the decoder can distort the measurement of time, which may be needed by the various onboard software-processes and to maintain the decoder's time reference (in order to, for example, automatically 'wake-up' the decoder from standby mode). Insofar as the clock rate reduction can be defined, it will be appreciated by someone skilled in the art that a new time reference can be calculated without difficulty.

Figure 2:
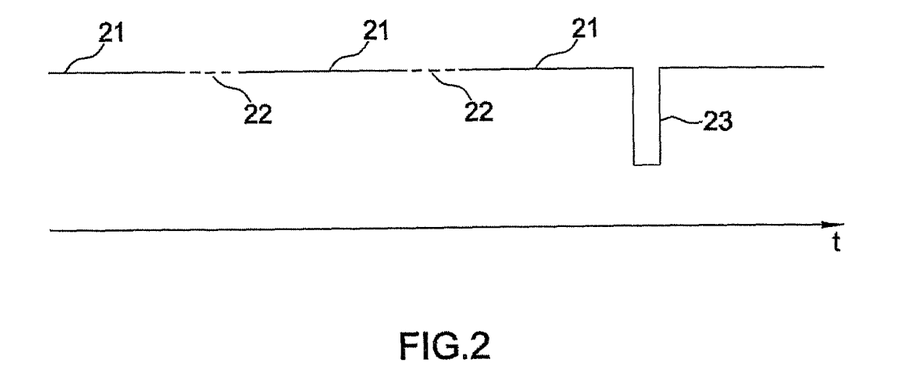
FIG. 2 is an illustration of a standby mode management function according to embodiments of the present invention.

FIG. 2 illustrates the functional modes of decoder 1 as a function of time t.

The run mode 21 of decoder 1 is represented by solid lines. When decoder 1 is in run mode 21, decoder 1 is switched on and powered. While TV programs are playing out, decoder 1 runs the onboard software, which manages the digital data that is broadcast with the A/V data. This data includes EIT information about TV program content and used by the EPG application, interactive applications and their respective data that can be displayed on TV 3, and any other digital data that is provided with the A/V data broadcast by the TV channels/stations/operators.

The frozen mode 22 of decoder 1 is represented by broken lines 22. In this mode, decoder 1 has been put into standby mode (e.g. by a user/subscriber). This means, for example, that a user/subscriber has decided to stop receiving the broadcast of TV programs. According to the embodiments of the present invention, this standby mode is not a conventional standby mode as would be understood by someone skilled in the art, since the onboard software of decoder 1 is not actually shut down/stopped. Rather, the onboard software is frozen and more specifically, execution of the onboard software is suspended and the execution context of the onboard software at the time execution of the onboard software was suspended is stored in the memory.

Decoder 1 remains in frozen mode 22 until a run command is received by decoder 1. When such a run command is received, decoder 1 leaves frozen mode 22 and enters run mode 21. The onboard software is restarted using the execution context previously stored in memory. Thus all of the data that was previously stored in RAM continues to be useable, thus obviating the need to reacquire this data from the data broadcast to decoder 1 by the operator with the A/V data. As mentioned above, this acquisition process is a lengthy one and thus a decoder operating according to embodiments of the present invention saves the costs of this acquisition process.

Figure 3:
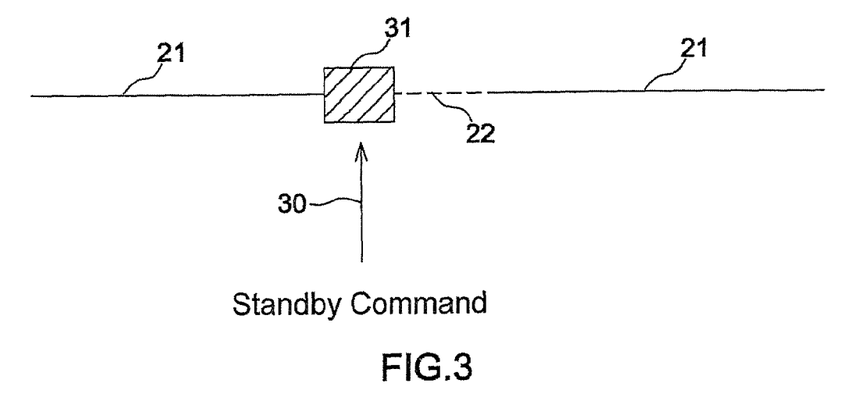
FIG. 3 is a more detailed depiction of the operations carried out when a decoder goes into standby mode according to embodiments of the present invention.

FIG. 3 illustrates in more detail the operations undergone by decoder 1 when it enters into frozen mode 22. When decoder 1 receives a standby mode command 30 (e.g. from remote control device 5), decoder 1 launches an acquisition procedure 31 that saves the current interactivity image of the onboard software, that is to say the group of applications (DVB-MHP, HTML, Java, etc.) and the other digital data (e.g. EIT, image data, XML files, etc.) that have been downloaded to decoder and are being used/run by the onboard software.

In contrast to the resident image (which comprises applications and/or data that are resident in decoder 1 and which change infrequently), the interactivity image comprises applications and/or data that change frequently (e.g. every day). Therefore, acquisition procedure 31 may also update the current interactivity image of the onboard software before saving the current interactivity image. For example, the EIT forms part of the interactivity image and the EIT data is used the resident EPG application in decoder 1. After an interactivity image update, the EPG is able to display an updated EPG with the most up to date event information. As a further example, a weather data file may form part of the interactivity image and the weather data file is used by a DVB-MHP application that provides local weather forecast information. After an update of the interactivity image, the weather application is able to display the most up to date weather forecast information.

Once the interactivity image has been saved (which may be after the interactivity image has been updated), the execution context of the onboard software (i.e. the state of the onboard software) is also acquired and saved in RAM memory. When the interactivity image is used by the onboard software, the interactivity image comprises the execution context of the onboard software.

The stored interactivity image and execution context are therefore available to decoder 1 when decoder 1 is restarted (i.e. comes out of frozen mode 21) and subsequently re-enters run mode 21.

The acquisition of the interactivity image and execution context can take several minutes (e.g. 10-20 minutes) and therefore it is possible that a user might launch a decoder run command before the context acquisition program 31 has been completed. For example, if they have put decoder 1 into standby but then changed their mind a short time afterwards. In such a case, since the current interactivity image and execution context have not been acquired, the previous interactivity image and execution context that are already stored in memory are used, typically without any loss of performance quality.

Referring once again to FIG. 2, decoder 1 successively controls execution of onboard software when it is run mode 21, and freezing of the onboard software when it is in frozen mode 22.

Since the onboard software never actually stops running, as time goes by it becomes increasingly-unstable, mainly due to memory loss. Preferably therefore, in order to maintain the execution stability of the onboard software, a genuine software reset 23 is carried out at regular intervals (i.e. the onboard software is rebooted) and is carried out just before decoder 1 goes into frozen mode 22.

It is to be noted however that such a reboot operation 23 is detrimental from a data availability standpoint, mainly due to the loss of information stored in RAM. In particular, if the reboot operation 23 is interrupted, no further interactivity image or execution context is available, not even a previously stored interactivity image or execution context.

Therefore, the reboot operation 23 is preferably carried subject to one or more conditions, including for example:
- the onboard software has not been rebooted for a predetermined number of days; and/or
- decoder 1 is put into standby mode at a late hour of the day (e.g. after 10 pm, or after 12 am); and/or
- decoder 1 has entered the frozen mode 22 a predetermined number of times.

Other conditions for deciding when to carry out an onboard software reboot 23 will be apparent to someone skilled in the art. Decoder 1 applies one of more of these conditions using an internal clock or any other clock, e.g. a clock that is external to decoder 1.

The periods when the decoder is in run mode 21, which correspond to the running of the onboard software, and the periods when decoder 1 is in frozen mode 22, which correspond to the freezing of the onboard software, have greatly variable durations. These durations can last anything from a few minutes to several hours and even several days.

The status of decoder 1 when it is in run mode 21 can be interpreted differently than when decoder 1 is in frozen mode 22. For example, when decoder 1 is left running (i.e. switched on in run mode 21) for a lengthy period, this can be attributable to the user watching TV but on the other hand it could also be attributable to the user having forgotten to switch decoder 1 off when the user stops watching TV. Decoder 1 then remains on without anyone watching TV. Preferably, therefore, decoder 1 has the capacity to run a series of tests in order to detect this infelicitous status. For example, decoder 1 can automatically detect if one of the following occurs:

If decoder 1 is running at a late hour, e.g. after midnight; and/or

If decoder 1 remains inactive for a predetermined amount of time (e.g. 2-4 hours), a status which is conveyed by the fact that decoder 1 does not receive a command (e.g. from remote control device 5) to change channel or change the volume, for example.

Other ways of detecting whether or not decoder 1 has inadvertently been left running will be apparent to someone skilled in the art.

On detecting that decoder 1 has been inadvertently left running, decoder 1 could then reboot the onboard software (if, for example, one or more of the above mentioned conditions for carrying out a reboot of the onboard software is met). Alternatively, if a reboot of the onboard software is not necessary, decoder 1 can enter frozen mode 22. Preferably, it is possible to disable this type of automatic standby mode by sending a command to decoder 1, e.g. using remote control device 5.

When decoder 1 remains in frozen mode beyond a predetermined duration (e.g. when the subscriber is on vacation), decoder 1 preferably also has the capability to go into run mode 21 for long enough to carry out a reboot 23 of the onboard software. Once this reboot has been carried out, decoder 1 preferably automatically goes back into frozen mode 22 after having carried out the acquisition procedure 31.

Figure 4:
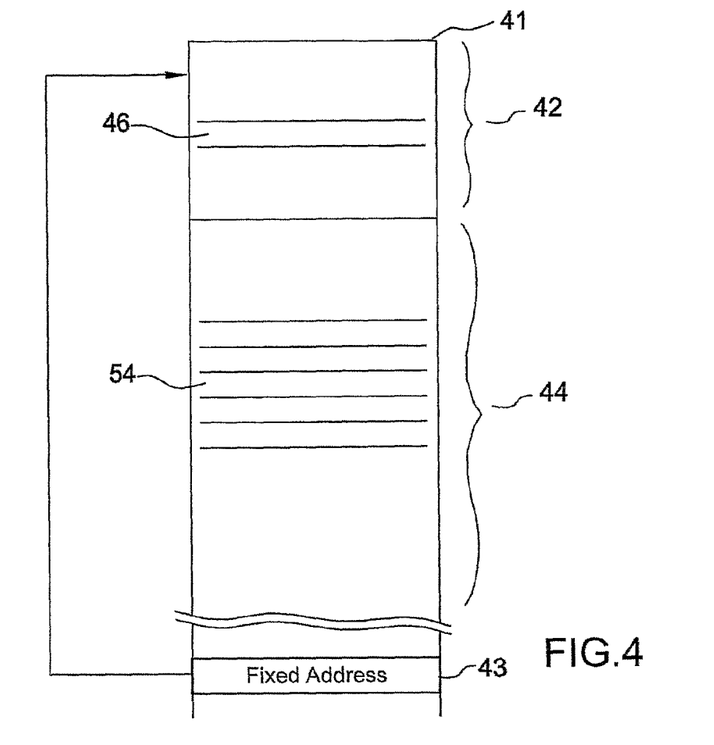
FIG. 4 illustrates an example of the structure of the memory contained in the decoder according to embodiments of the present invention.

FIG. 4 illustrates how applications and data acquired from the broadcast data stream, that is to say the acquired interactivity image, which allows for a rapid restart following a reboot of the onboard software, is managed. More particularly, FIG. 4 shows the structure of the data that is stored in RAM memory 41.

In decoder 1, according to embodiments of the present invention, RAM memory 41 remains powered when decoder 1 goes into frozen mode 22 for the purpose of interactivity image and execution context acquisition and retention as well as for rebooting the onboard software (if necessary). The structure of the RAM memory 41 also allows for instantaneous restoration of data stored within RAM memory 41 following any reboot of the onboard software.

The RAM memory comprises the cache memory storing the EIT information, DVB-MHP type applications, and other types of applications and digital data (i.e. the interactivity image). The RAM memory also comprises the operating system software for decoder 1, as well as intermediate software layers (middleware) that enable the various applications in the decoder to function.

Prior to the advent of the present invention, after a software reboot, even if the RAM remained powered, the addresses that pointed to the execution context data were deleted or were replaced by other addresses in such a way that the execution context was lost. Moreover, launching standby mode involved a software reset, which resulted in a loss of all access to the RAM data. As a result, all data that had previously been downloaded from the broadcast data flow, as well as the data that was stored in the RAM memory, was lost. If the decoder architecture did not have a hard drive, a systematic reloading of the various caches was unavoidable. If on the other hand the decoder architecture did have a hard drive, this data could be backed up and restored after the decoder came out of standby mode and carried out a software reset. However, this data was not immediately useable since it was necessary for it to be recopied and then transferred to the RAM memory, which was a relatively lengthy process.

According to embodiments of the present invention, RAM memory 41 comprises a secure memory zone 42, which is addressed using a fixed address 43 that remains unchanged even after a reboot of the onboard software. The secure memory zone 42 comprises dedicated areas 46, which store data relating to the properties of a backup memory zone 44. Backup memory zone 44 itself comprises data storage areas 54, which store the data that is to be continuously saved, including the data that is to be saved after a reboot of the onboard software. The properties of backup memory zone 44 that are stored in dedicated areas 46 of secure memory zone 42 include all the information that allows data stored in the data storage areas 54 to be found and parsed, and quota information about backup memory zone 44 for statistical and maintenance operations. These properties relate to, for example, the addresses of data storage areas 54 in backup memory zone 44, the type of data stored in the data storage areas 54, the total size of backup memory zone 44, the memory blocks in backup memory zone 44 that have been allocated (i.e. used memory blocks), the memory blocks in backup memory zone 44 that are being used (i.e. free memory blocks), and checksums of the aforementioned data storage areas 54 calculated according to any known checksum algorithm.

If, for example, the cache is updated with updated data or new applications are loaded onto decoder 1, particularly during the acquisition procedure 31 that is performed when frozen mode 22 is entered, the updated data/new applications are saved in data storage areas 54 of backup memory zone 44. The properties of data storage areas 54 as well as a checksum that is computed for each data storage area 54 are then stored in dedicated areas 46 of secure memory zone 42.

When decoder 1 leaves frozen mode 22, particularly after a reboot of the onboard software, the checksums of the data storage areas 54 of backup memory zone 44 are computed and compared with the checksums that are stored in the dedicated areas 46 of secure memory zone 42. If these checksums match, the cached updated data or new applications are made available to decoder 1.

Figure 5:
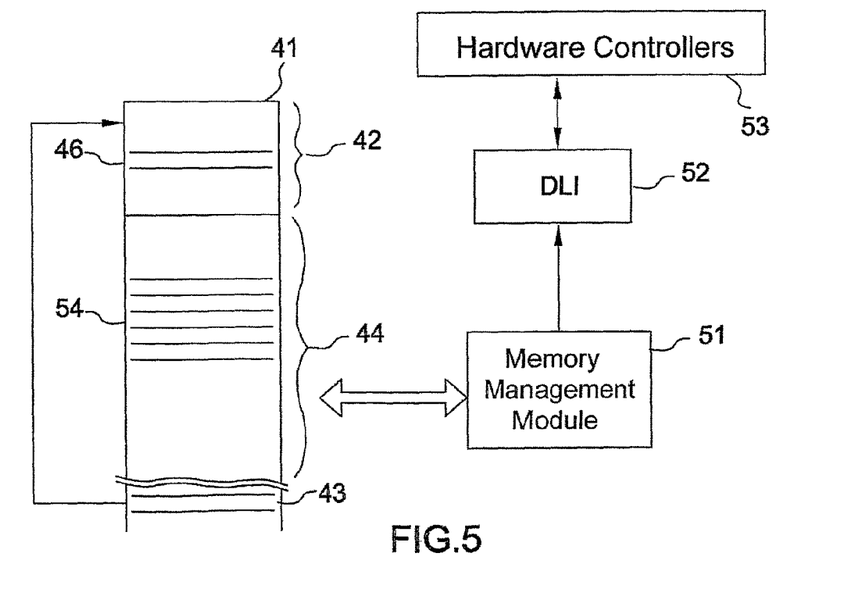
FIG. 5 illustrates the elements of a decoder according to the embodiments of the present invention.

FIG. 5 shows the elements of the onboard software architecture in decoder 1, according to embodiments of the present invention. Memory management module 51, which manages the structure of the data in RAM memory 41, is a software program that is run by a processor not shown in FIG. 5. The RAM data, whose structure is shown both in FIG. 4 and FIG. 5, is managed by memory management module 51.

When the middleware is initialised, the memory management module 51 retrieves the middleware properties used for program execution from a software component known as a device layer interface 52 (DLI). DLI 52 provides an interface between the middleware layer and decoder hardware controllers 53. These middleware properties, as well as the size of RAM memory 41 and the fixed address 43 remain, in general, unchanged from one reboot to another, except when new onboard software (or a new version of the onboard software) is downloaded or in the event that fixed address 43 has to change (e.g. if the size of RAM has to increase in order to accommodate a new feature of decoder 1).

The organising principle of RAM memory 41, according to embodiments of the present invention, initially comprises reserving a group of dedicated areas 46 in secure memory zone 42 (which it will be remember is addressed using fixed address 43), whereby the sizes of these dedicated areas 46 are defined according to the individual needs of the various applications. The addresses of each of the dedicated areas 46 are identified by an identifier ID, which is supplied by the memory management module 51 on the creation of secure memory zone 42. Each dedicated area 46 is allocated a header that describes the properties of an associated data storage area 54. This header contains the following information (for example):
- the address of the associated data storage area 54;
- the type of data which is stored in the associated data storage area 54;
- the memory blocks of back memory zone 44 that have been allocated;
- the memory blocks of backup memory zone 44 that are still free;
- the total size of the backup memory zone 44; and
- a checksum.

The onboard software in decoder 1 is therefore aware of the effective memory usage and can use this information to manage any errors that occur due to the amount of data exceeding the available memory.

The headers are stored using fixed address 43 in secure memory zone 42. The size of secure memory zone 42 is, for example, 512 octets.

In the case of a reboot of the onboard software, the program modules of the onboard software that have reserved for them a part of secure memory zone 42, store application data in a data storage area 54 of backup memory zone 44 that is associated with the program module; and also store the properties of the application data and the entry points to this application data. These program modules then signal the memory management module 51 informing it that it can store the properties and addresses of these data storage areas 54 in dedicated areas 46 of secure memory zone 42. If the application data is saved successfully, the memory management module 51 computes a checksum for the data storage areas 54, and then stores this checksum in the dedicated areas 46 of secure memory zone 42.

At the end of the rebooting of the onboard software, the allocated data storage areas 54 of backup memory zone 44, as well as dedicated areas 46 of secure memory zone 42 are in the state that they had been in while decoder 1 was in frozen mode 22. When the decoder leaves frozen mode 22, the memory management module 51 analyses dedicated areas 46 of secure-memory zone 42 by recomputing the various checksums of the allocated data storage areas 54, and compares these checksums to those that were previously stored, thus allowing the system to ensure that the data is coherent. If the checksums match, the memory management module 51 reinitialises the data storage areas 54 in such a way that they revert to their status at the time decoder 1 went into frozen mode 22. Otherwise, these areas are reinitalized in such a way that they become free areas.

Each dedicated area 46 comprises a generic allocation and clearing function that adopts as a parameter a unique identifier ID characterising the area and used to identify a specific data block. The onboard software of decoder 1 provides specific functions that allow program modules to directly access a data block using the unique identifier ID. Thus, each program module of the onboard software that wishes to save application data can do so using these functions. The memory management module 51 allows for the allocation of memory areas of a fixed size. This is advantageous in that it makes the allocation process much more rapid than a basic allocation process and avoids memory fragmentation (i.e. data is not fragmented and stored throughout the entire RAM but rather is gathered in a specific portion of the RAM). At the end of a rebooting of the onboard software due to an onboard software download or a cold start (i.e. starting after decoder 1 has been completely powered down (unplugged)), the previously saved application data is invalidated. This may be because the cache structure may be different for the newly downloaded onboard software or may be because prior to a cold start, the RAM was without power and therefore the data needs to be 'cleaned'. In this case, DLI 52 deletes the data from secure memory zone 42. Thus, memory management module 51 can consider the dedicated areas 46 of secure memory zone 44 as though they were obsolete, which means that the memory management module 51 need only reinitialise these areas and in so doing handles them like free space. Hence, when a program module that has saved application data launches a sequence for retrieving this saved application data, the memory management module 51 indicates that this data is obsolete.

When a program module containing application data in an allocated data storage area 54 wishes to access this data, the program module asks the memory management module 51 (using its identifier ID) to send it the data from the allocated data storage area 54.

Numerous onboard systems for decoders simulate standby using a mode known as fake standby, which simply comprises deactivation of the decoder inputs and outputs, resulting in a black/blank screen on the TV. However, new directives require implementation of a genuine power saving mode. The embodiments of the present invention that have been described above allow a decoder to go into such a power saving mode, allow for the instantaneous retrieval of data in a format that can be used immediately by the decoder's onboard applications, and allow for the passage to a power saving mode without any data loss, irrespective of the decoder architecture used or the presence or absence of a hard drive. The RAM memory of the decoder remains powered if the onboard software is rebooted and following a reboot, the onboard software restarts quickly, typically within 10-15 seconds. If RAM is not managed in accordance with embodiments of the present invention, restart of the onboard software can take longer after a software reboot. This problem does not arise in the case of a freeze standby mode as described above.

It is appreciated that various features of the invention which are, for clarity, described in the contexts of separate embodiments may also be provided in combination in a single embodiment Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

The invention claimed is:

1. A method of operating a digital television decoder, said decoder comprising a random access memory, said random access memory storing onboard software, wherein said decoder is operable in a run mode to execute said onboard software, said method comprising:
  downloading a group of applications and data usable by said applications, said group of applications and data together forming a current interactivity image of the onboard software that is broadcast with audio-visual data;

activating a power saving mode on said decoder; and
upon activating said power saving mode:
- maintaining power to said random access memory;
- suspending execution of said onboard software;
- acquiring an execution context of said onboard software;
- updating said current interactivity image by downloading an updated interactivity image; and
- saving said updated interactivity image and said execution context in said memory;

wherein said updated interactivity image and execution context is are saved in a data storage area of said random access memory, wherein properties of said data storage area are stored in a secure area of said random access memory, and wherein said secure area is addressed by a fixed address that remains unchanged even after a rebooting of said onboard software.

2. A method according to claim 1, wherein execution of said onboard software remains suspended until said run mode is activated, and upon activation of said run mode: resuming execution of said onboard software using said updated interactivity image and execution context.

3. A method according to claim 1, wherein if said run mode is activated prior to the end of updating said interactivity image, execution of said onboard software resumes using an interactivity image and execution context that were previously saved in said random access memory.

4. A method according to claim 1, wherein properties of said context storage area are stored in a property storage area of said secure area, and wherein said property storage area comprises an address for said context storage area.

5. A method according to claim 4, wherein said property storage area comprises a checksum that is computed for said context storage area.

6. A method according to claim 5, wherein prior to suspending execution of said onboard software, said onboard software is rebooted, and following said rebooting of said onboard software said method further comprises:
- recomputing a checksum for said context storage area; and
- comparing said recomputed checksum with said checksum stored in said property storage area of the secure area;
- wherein if said recomputed checksum that is recomputed for said context storage area is the same as the checksum stored in said property storage area of said secure area, the execution context saved in said context storage area is used to run said onboard software.

7. A method according to claim 4, wherein said property storage area stores information relating to type of data and size of memory allocated to said context storage area.

8. A method according to claim 1, said decoder further comprising: an internal clock running at a clock rate; and other hardware, wherein activating said power saving mode comprises limiting said clock rate and shutting down hardware not critical for maintaining power to said random access memory.

9. A method according to claim 1, wherein prior to suspending execution of said onboard software, said onboard software is rebooted.

10. A method according to claim 9, wherein said onboard software is rebooted only if the time that has elapsed since said onboard software was previously rebooted exceeds a predetermined value.

11. A method according to claim 10, further comprising measuring the time that has elapsed using a clock; and resetting the time to compensate for the reduction of the clock frequency while said decoder is in said power saving mode.

12. A method according to claim 11, wherein said clock comprises an internal clock.

13. A method according to claim 11, wherein said clock comprises an external clock.

14. A method according to claim 9, wherein said onboard software is rebooted only if execution of said onboard software has been suspended a predetermined number of times.

15. A digital television decoder comprising:
- a receiver downloading a group of applications and data usable by said application, said group of applications and data together forming an interactivity image of onboard software executable by said decoder in a run mode and broadcast with audio-visual data;
- a random access memory, said random access memory storing said onboard software, said random access memory comprising:
- a data storage area operable to store: an execution context acquired after execution of said onboard software is suspended; and an updated interactivity image downloaded after execution of said onboard software is suspended, following said decoder being placed in a power saving mode, and
- a secure area addressable by a fixed address that remains unchanged even after a rebooting of said onboard software, wherein said secure area comprises property storage areas operable to store properties of said data storage area.

16. A digital television decoder comprising:
- a receiver for downloading a group of applications and data usable by said application, said group of applications and data together forming an interactivity image of onboard software executable by said decoder in a run mode and broadcast with audio-visual data;
- memory means for storing said onboard software, said memory means comprising:
- data storage means for storing: an execution context acquired after execution of said onboard software is suspended; and an updated interactivity image downloaded after execution of said onboard software is suspended, following said digital television decoder being placed in a power saving mode; and
- secure storage means for storing, wherein said secure storage means is addressable by a fixed address that remains unchanged even after a rebooting of said onboard software, and wherein said secure storage means comprises property storage means for storing properties of said data storage means.

* * * * *

UNITED STATES PATENT AND TRADEMARK OFFICE
CERTIFICATE OF CORRECTION

PATENT NO. : 8,665,962 B2
APPLICATION NO. : 12/227758
DATED : March 4, 2014
INVENTOR(S) : Taleb et al.

It is certified that error appears in the above-identified patent and that said Letters Patent is hereby corrected as shown below:

In the Specification

Column 10, line 48, delete "embodiment Conversely" and substitute therefor --embodiment. Conversely--.

In the Claims

Column 11, line 11, claim 1, delete "context is are" and substitute therefor --context are--.

Signed and Sealed this
Twenty-seventh Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,665,962 B2                                       Page 1 of 1
APPLICATION NO.  : 12/227758
DATED              : March 4, 2014
INVENTOR(S)        : Taleb et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1239 days.

Signed and Sealed this

Twenty-ninth Day of September, 2015

Michelle K. Lee
*Director of the United States Patent and Trademark Office*